United States Patent

[11] 3,544,090

| [72] | Inventor | Martinus F. Peeters<br>218 Lakewood Drive, Oakville, Ontario,<br>Canada |
|---|---|---|
| [21] | Appl. No. | 774,456 |
| [22] | Filed | Nov. 8, 1968 |
| [45] | Patented | Dec. 1, 1970 |

[54] KILN FOR MAKING CEMENT CLINKER
6 Claims, 2 Drawing Figs.

| [52] | U.S. Cl. | 263/29 |
|---|---|---|
| [51] | Int. Cl. | F27b 1/00 |
| [50] | Field of Search | 263/29 |

[56] References Cited
UNITED STATES PATENTS

| 2,654,589 | 10/1953 | Somogyi | 263/29 |
|---|---|---|---|
| 2,788,961 | 4/1957 | Pooley et al. | 263/29 |
| 3,094,316 | 6/1963 | Turin | 263/29 |
| 3,140,864 | 7/1964 | Lellep | 263/29 |
| 3,204,936 | 9/1965 | Beckenbach | 263/29 |

Primary Examiner—Charles J. Myhre
Attorney—George H. Riches

ABSTRACT: A kiln, of the vertical type, for producing cement clinker and like materials in which the meal descends by gravity through a preheat chamber, a burning chamber, and cooling chamber, the cement clinker being removed from the bottom. Fresh air is withdrawn from the cooling chamber and injected into the burning chamber through orifices in the wall of the burning chamber. The injected air keeps the descending molten meal away from the walls of the burning chamber which ensures better contact between meal and flame and prevents coating the walls of the kiln with agglomerate.

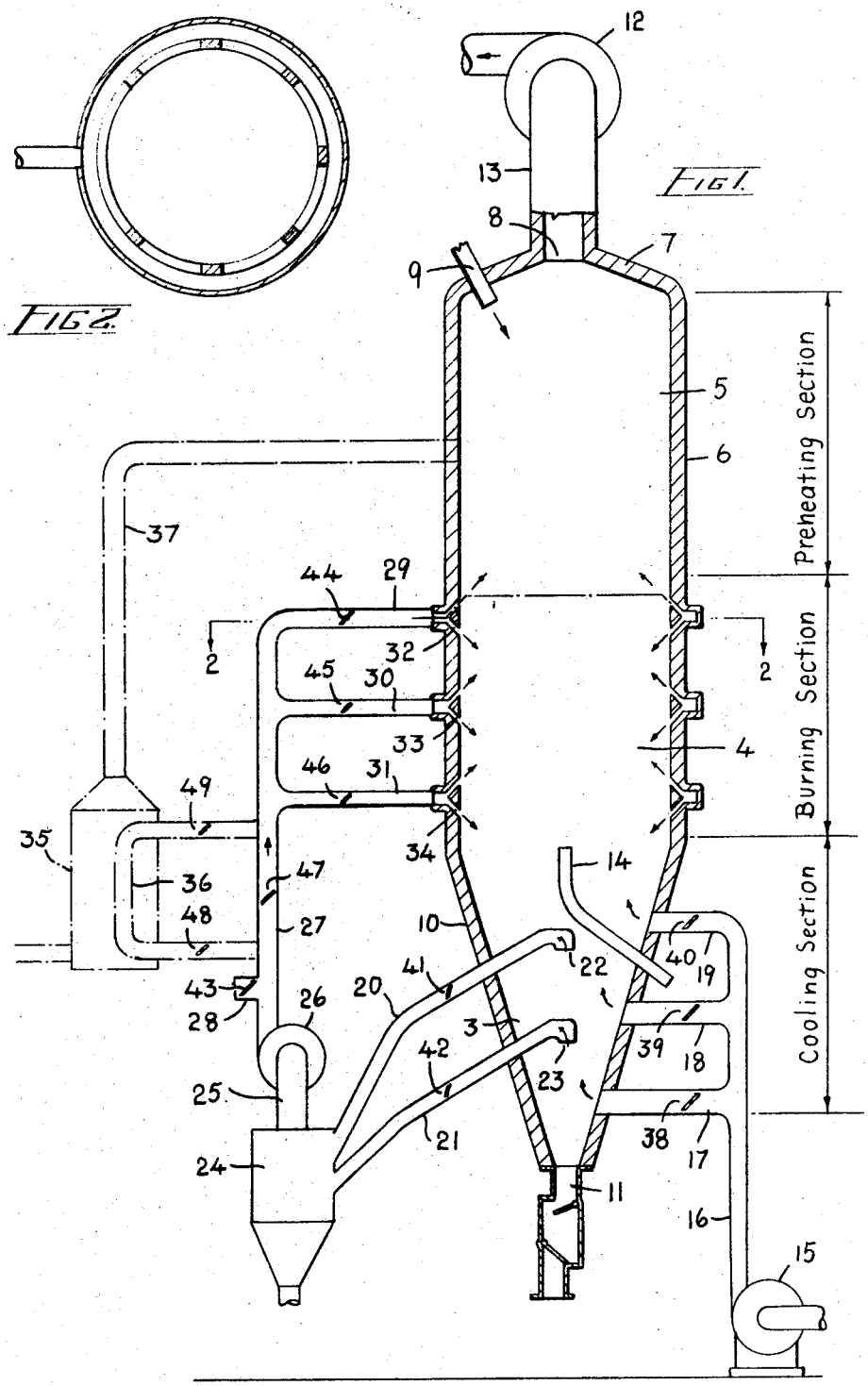

3,544,090

KILN FOR MAKING CEMENT CLINKER

BACKGROUND OF THE INVENTION

Rotary kilns, with or without raw material heating devices are used extensively for the production of portland cement clinker and like materials. However, a rotary kiln is not a very efficient heat transfer device, the reason being that the contact surface between gas and material, per cubic foot of kiln volume, is small. As a result, a rotary kiln must be very long in order to keep the heat losses in the exhaust gas within reasonable limits. But a long kiln means high radiation losses and high initial cost.

To improve this situation, it has been proposed that kilns be equipped with devices which use part of the heat in the kiln exhaust gas for preheating the raw materials. Such devices can be located inside the kiln itself (chains or crosses) or they can be external, such as grate-type preheaters or suspension preheaters. Almost all cement kilns are equipped with devices for cooling the clinker after discharge from the kiln.

The use of preheaters results in shorter kilns and smaller heat requirements to produce a ton of clinker. But the preheater rotary kiln-cooler combination requires, nevertheless, still considerable space. Further disadvantages are high first cost and high maintenance cost.

It has been proposed to replace the rotary kiln by a device in which particulate kiln feed material, herein referred to as raw meal, is clinkerized by blowing the meal into a cyclone, having fuel burners located along the inside periphery of the cyclone wall. Such a structure eliminates the rotary kiln. One such structure is described in U.S. Pat No. 2,634,116 issued to Joshua Witt. Apparatus of this type proved to be relatively small and produced high strength cement clinker, having a small average particle size. However, a disadvantage of the foregoing structure is that the semimolten clinker tends to coat the cyclone wall, which necessitates frequent steps for cleansing the burning chamber.

OUTLINE OF THE INVENTION

The apparatus and method of the present invention solves the problems present in the foregoing apparatus and provides for the reduction or complete avoidance of the agglomeration of meal or clinker against the wall of the burning chamber. The method and apparatus of the present invention also ensures a more intensive heat transfer in the burning zone.

Briefly, the invention consists of preheating and clinkerizing the meal and cooling the clinker while suspended in a vertical counterflow shaft and blowing a portion of the required combustion air through openings in the shaft wall in the area where clinkerizing takes place in such a way that agglomeration of meal or clinker against the wall is reduced or completely avoided.

The kiln for making cement clinker according to the present invention comprises:
a. a substantially long, preferably cylindrical, casing closed at the top and bottom and having:
i. a raw meal preheat chamber in the top portion thereof;
ii. a clinker cooling and discharge chamber in the bottom portion thereof; and
iii. a burning chamber between the preheat chamber and the cooling chamber.
b. a kiln hot gas outlet in the top communicating with the preheat chamber;
c. a clinker discharge outlet at the bottom of the cooling and discharge chamber;
d. means for delivering clinker-forming meal to the preheat chamber;
e. a forced gas means communicating with the hot gas outlet to withdraw exhaust gas from the casing;
f. a burner in the burning chamber;
g. a first forced-air means delivering fresh air through the cooling chamber to the burning chamber to cool the clinker and subsequently support combustion in the burning chamber; and
h. a second forced-air means extracting fresh air from the cooling chamber and injecting the same into the burning chamber through a plurality of orifices formed in the portion of the casing surrounding the burning chamber whereby said air is directed towards the vertical axis of the preheat section.

The method of making cement clinker in accordance with the present invention comprises the steps of:
a. burning fuel in the burning chamber;
b. introducing raw meal into the top of the preheat chamber, so that the meal will descend by gravity against the rising gas stream, first through the preheating section, then through the burning section and finally through the cooling section;
c. discharging the clinker from the cooling chamber;
d. introducing fresh air into the cooling chamber and burning chamber for cooling the clinker and supporting combustion in the burning chamber; and
e. extracting a portion of the fresh air from the cooling chamber through a duct leading therefrom to the burning chamber and injecting said fresh air into the burning chamber through a plurality of orifices formed circumferentially in the wall of the burning chamber to thereby form an airstream directed towards the vertical axis of the burning chamber.

DESCRIPTION OF THE INVENTION

The method and apparatus of the present invention will now be described with reference to the accompanying drawings, schematically representing the kiln of the invention:

FIG. 1 is a vertical cross section of the preheating, burning and cooling apparatus; and FIG. 2 is a cross section on the line 2—2 of FIG. 1.

In its preferred form, the device comprises a substantially long casing 6 having a closed end 7 which is provided with a gas outlet 8 and a raw material inlet 9 at the upper end and an inwardly tapered bottom portion 10 which terminates at its lower end with a clinker outlet 11. The clinker outlet is of a type which prevents false air entering the casing.

In the present illustration, the inside of the casing is divided into a preheating chamber 5, a clinkerizing chamber 4, and a cooling chamber 3.

The gas outlet 8 is connected to an exhaust fan 12 by means of the duct 13.

The clinkerizing chamber is provided with a burner 14 which is diagrammatically illustrated and which has its outlet near the bottom of the clinkerizing chamber. A forced-air means for delivering air for cooling the clinker and for supporting the combustion of the fuel supplied by the burner comprises cooler fan 15, the conduit 16 and branch lines 17, 18, 19. Fresh air is thus blown into the cooling chamber and is available for the combustion of fuel in the burning chamber.

A part of the fresh air which is injected into the cooling chamber 3 is withdrawn from that chamber and injected into the burning chamber by a second forced-air means comprising ducts 20, 21, inlets 22, 23 which are disposed within the cooling chamber 3, dust collector 24, duct 25, fan 26, duct 27, outlet 28, and branch lines 29, 30, 31. Outlet 28 communicates with the atmosphere and branch lines 29, 30, 31 respectively communicate with three sets of orifices 32, 33, 34 each set of orifices being spaced uniformly around the wall of the casing 6 which surrounds the clinkerizing chamber 4. The lowermost set of orifices 34 being placed close to the bottom of the clinkerizing chamber with each of the other sets disposed in vertical spaced relation substantially as illustrated. In the preferred embodiment, the orifices consist of narrow slots through which the air will be sprayed inwardly towards the vertical axis of the clinkerizing chamber and diagonally with respect to the inside vertical wall of the clinkerizing chamber. It will be thus seen from the construction just described that fresh air which contains a substantial amount of oxygen will be withdrawn from the cooling chamber 3 passed through the dust collector 24 and forced by the fan 26 through the three sets of orifices 32, 33, 34 with substantial velocity. The air provides a protective air curtain covering the entire wall of the burning chamber and thus inhibits the agglomeration of molten clinker on the chamber walls.

Any air required for cooling the clinker, but not for combustion, can be evacuated from the system through outlet 28.

If necessary a heating system may be provided for heating the fresh air before it is discharged into the burning chamber. The heating system comprises an air heater 35 with an air heating circuit 36 through which the air from the cooling chamber is passed. The air heater 35 may have its hot gas outlet connected to the preheater chamber 5 by means of the duct 37 so that the hot gasses therefrom can be introduced into the preheat chamber.

The flow of gas through the ducts 17, 18, 19, 20, 21, 28, 29, 30, and 31 is controlled respectively by dampers 38, 39, 40, 41, 42, 43, 44, 45, and 46. If an air heater is used, the passage of air through the duct 36 is controlled by dampers 47, 48, 49.

The air temperature at inlet 22 will not be the same as the air temperature at inlet 23. The temperature of the air flowing through orifices 32, 33, and 34 can therefore be regulated by changing the position of dampers 41, 42, thus varying the relative volumes of air passing through inlets 22 and 23.

The kiln for making cement clinker operates in the following manner:

Air required to cool the clinker and sustain combustion is introduced into the cooling chamber 3 through fan 15, conduit 16 and branch lines 17, 18, 19. Fuel is burnt at the outlet of burner 14. The hot gases, generated by this burning process rise through the burning section and preheat chamber and are evacuated from the system through gas outlet 8, duct 13 and exhaust fan 12. Raw meal is admitted through meal inlet 9 and gravitates slowly downwards against the rising gas stream. On its way downwards the meal is preheated by contact with the gases in the preheat chamber 5 and burnt to clinker by direct contact with the flame in burning chamber 4. The clinker is then cooled during its descent through the fresh air in cooling chamber 3 and is discharged through the clinker outlet 11.

Fan 26 withdraws part of the air from cooling chamber 3 through inlets 22 and 23, ducts 20 and 21, dust collector 24 and duct 25 and injects said air into the burning chamber 4 through duct 27, branch lines 29, 30, 31 and orifices 32, 33 and 34. Any meal or clinker particles approaching the wall of the burning chamber become entrained in the air streams, entering the burning chamber through orifices 32, 33 and 34 and are thus carried away from the wall and conveyed towards the flame in the center of the burning chamber. In this manner a good contact between meal and flame will be obtained and coating of the burning chamber wall with agglomerate will be prevented. In case the amount of air required for cooling the clinker exceeds the amount of air required for combustion, the excess air can be evacuated by opening damper 43 in outlet 28.

I claim:

1. A vertical kiln for making cement clinker comprising:
   a. a substantially long casing closed at the top and bottom and having located therein:
      i. a raw meal preheat chamber in the top portion thereof;
      ii. a cooling and clinker discharge chamber in the bottom portion thereof; and
      iii. a burning chamber between the preheat chamber and the cooling chamber.
   b. a kiln hot gas outlet in the top communicating with the preheat chamber;
   c. a clinker discharge outlet at the bottom of the cooling and discharge chamber;
   d. means for delivering clinker-forming meal to the preheat section;
   e. a forced-gas means extracting exhaust gas from the casing through the hot gas outlet;
   f. a burner within the burning chamber;
   g. a first forced-air means delivering fresh air to the cooling chamber and the burning section to cool the clinker and to support combustion in the burning chamber; and
   h. a second forced-air means extracting air from the cooling chamber and injecting the same into the burning chamber through a plurality of orifices formed in the portion of the casing surrounding the burning section whereby said air is directed towards the vertical axis of the burning section, the forced-gas means and first forced-air means cooperating to form an upwardly flowing gas stream throughout the length of the casing and through which said raw meal moves as a suspension from the preheat chamber to the burning chamber.

2. A kiln according to claim 1 having a dust collector in the second forced-air means for the removal of airborne meal before injecting said air into the burning section.

3. A kiln according to claim 1 in which the orifices in the portion of the casing surrounding the burning section consist of slots directing the air inwardly towards the vertical axis of the burning chamber and diagonally with respect to the inside vertical wall of the burning chamber.

4. A kiln according to claim 1 in which the second forced-air means comprises means for extracting two streams of air from the cooling chamber at two separate locations, each airstream being extracted from the cooling chamber at different elevations, both airstreams being regulatable as to temperature, and combining said airstreams to a single stream of uniform temperature prior to injecting the air into the burning chamber through a plurality of orifices.

5. The method of making cement clinker in a vertical kiln having a preheat chamber in the upper portion and a cooling chamber in the lower portion comprising the steps of:
   introducing clinker meal into the preheat chamber;
   maintaining the meal as a downwardly moving suspension by inducing an upwardly flowing gas stream;
   burning said suspended meal in a burner chamber disposed in the kiln between the cooling chamber and the preheat chamber, said burning being effected by locating burners inside the burner chamber;
   said upwardly flowing gas stream being effected by
      a. forcing fresh air into the cooling chamber and the burning chamber for cooling the clinker and for supporting combustion in the burners located in the burning chamber;
      b. extracting a portion of the fresh air from tee cooling chamber through a duct leading therefrom to the burning chamber and injecting said fresh air directly into the burning section through a plurality of orifices formed circumferentially around the inside wall of the burning section to thereby form airstreams directed towards the vertical axis of the burning chamber; and
      c. exhausting the air and products of combustion through an outlet in the top of the kiln.

6. The method according to claim 5, the additional step of removing dust from the extracted portion of the fresh air before it enters the burning chamber.